May 11, 1948. W. P. SCHMITTER 2,441,446
FAN DRIVE
Filed Dec. 23, 1944
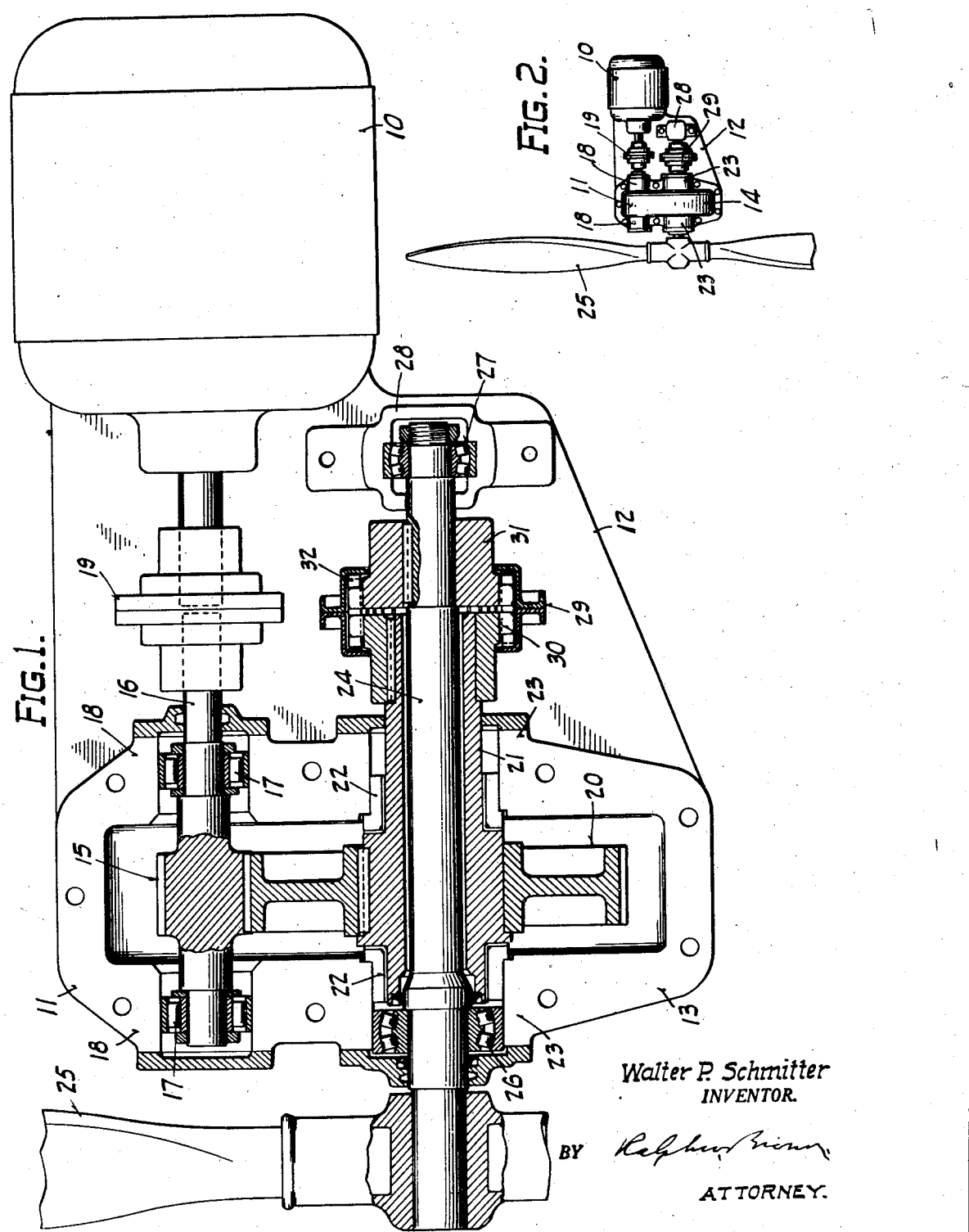
Walter P. Schmitter
INVENTOR.
BY
ATTORNEY.

Patented May 11, 1948

2,441,446

UNITED STATES PATENT OFFICE 2,441,446

FAN DRIVE

Walter P. Schmitter, Wauwatosa, Wis., assignor to The Falk Corporation, Milwaukee, Wis., a corporation of Wisconsin Application December 23, 1944, Serial No. 569,481

2 Claims. (Cl. 230—259)

This invention relates to geared drives for heavy duty fans such as are employed for moving large volumes of air or other gases through cooling towers, tunnels and the like.

One object of the present invention is to provide a satisfactory motor-driven geared unit for supporting and driving heavy duty fans.

The advantages of such a unit are well recognized, but heretofore none have proven satisfactory because of severe and premature wear particularly on the gears in the unit. I have discovered that in such units heretofore designed, gear wear is the result of gear disturbances brought about by the size and weight of the supported fan and by vibrations resulting from unavoidable unbalanced conditions of the fan and of the wind load on the fan during normal operation. A heavy duty fan for the purposes indicated is commonly ten or twelve feet in diameter, weighs four or five hundred pounds or more, and commonly operates at speeds of about four or five hundred revolutions per minute, so that the stresses imposed on the fan support are necessarily rather high.

A more specific object of the present invention is to provide a geared driving and supporting unit for heavy duty fans particularly adapted to adequately sustain the operating stresses peculiar to fan operation.

Another specific object is to provide a geared unit for supporting and driving heavy duty fans so constructed and arranged as to isolate the gears from the otherwise disturbing stresses peculiar to fan operation.

Other more specific objects and advantages will appear, expressed or implied, from the following description of an illustrative embodiment of the present invention.

In the accompanying drawings:

Figure 1 is a horizontal sectional view of a fan driving and supporting unit constructed in accordance with the present invention.

Fig. 2 is a plan view on a smaller scale illustrating the relation between the unit and the fan supported and driven by it.

The unit selected for illustration comprises a conventional driving motor 10 and a speed reducer 11, both carried by an appropriate base plate 12.

The speed reducer shown includes a housing consisting of a base portion 13 fixed to the base plate 12 and a removable cover portion 14, the latter having been removed in Fig. 1. The speed reducer shown also includes a pinion 15 formed integral with a shaft 16 journalled at opposite ends in suitable bearings 17 confined in and supported by aligned bearing hubs 18 provided in the housing. The pinion 15 is driven from the motor 10 preferably through a flexible coupling 19 and meshes with and drives a gear 20. The gear 20 is shown keyed to a hollow shaft 21 journalled in sleeve bearings 22 seated in aligned bearing hubs 23 provided in the housing.

A shaft 24 extending loosely through the hollow shaft 21 and supported independently thereof provides support for a large heavy duty fan 25. In this instance the fan 25 is shown carried by the forward projecting end of the shaft 24 which is journalled in a suitable bearing 26, preferably of the self aligning type, seated in one of the bearing hubs 23. The shaft 24 is extended rearwardly beyond the housing 11 where it is journalled in a bearing 27, preferably of the self-aligning type, fixed in a pillow-block 28 carried by the base plate 12. The wide spacing between the bearings 26 and 27 provides a remarkably stable support for the shaft 24 and the large heavy fan carried thereby.

The shaft 24 is driven from the gear 20 through a flexible coupling 29 of a well known type that insures radial freedom between the shaft and gear so that the gear 20 is isolated from stresses imposed upon the shaft 24 by the weight, inertia and axial thrust of the supported fan 25. In this instance the hollow shaft 21 of the gear 20 is extended rearwardly from the housing 11 and carries a radially slotted coupling member 30 keyed thereto. The other similarly slotted member 31 of the coupling is keyed to the shaft 20 and connected to the member 30 through a resilient grid-like structure 32 encircling the members 30 and 31 and engaged in the slots thereof. The coupling thus described is torsionally resilient and protects the gears against torsional disturbances commonly induced by fans of the character mentioned.

Various changes may be made in the embodiment of the invention hereinabove specifically described without departing from or sacrificing the advantages of the invention as defined in the appended claims.

I claim:

1. A fan drive comprising a housing, a shaft extending transversely therethrough, a fan carried and driven by one end of said shaft, a bearing carried by one side of said housing providing support for said shaft and fan adjacent the latter, means beyond the other side of said housing for supporting the opposite end of said shaft, a gear train in said housing including a hollow driven gear loosely encircling said shaft, bearings in said housing for supporting said hollow gear independently of said shaft, and a flexible coupling between said hollow gear and the last named end of said shaft through which said shaft is driven by said gear.

2. In a device of the character described the combination of a supporting base, a housing supported thereby, a shaft extending through said housing, a heavy duty fan carried by one end of said shaft and driven thereby, a bearing in one side of said housing adjacent said fan for supporting said end of said shaft, a bearing on said base beyond the opposite side of said housing for supporting the other end of said shaft, a gear train in said housing including a gear encircling and spaced from said shaft, bearings in said housing for supporting said gear, and a flexible coupling between said gear and said other end of said shaft through which said shaft is driven from said gear.

WALTER P. SCHMITTER.

REFERENCES CITED

The following references are of record in the file of this patent:

UNITED STATES PATENTS

| Number | Name | Date |
| --- | --- | --- |
| 1,415,556 | Heisler | May 9, 1922 |
| 1,586,900 | Hollander | June 1, 1926 |
| 1,758,267 | Wach | May 13, 1930 |